US008356179B2

(12) United States Patent
Tie et al.

(10) Patent No.: US 8,356,179 B2
(45) Date of Patent: Jan. 15, 2013

(54) ENTITY BI-DIRECTIONAL IDENTIFICATOR METHOD AND SYSTEM BASED ON TRUSTABLE THIRD PARTY

(75) Inventors: Manxia Tie, Xi'an (CN); Jun Cao, Xi'an (CN); Xiaolong Lai, Xi'an (CN); Liaojun Pang, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 339 days.

(21) Appl. No.: 12/739,678

(22) PCT Filed: Oct. 23, 2008

(86) PCT No.: PCT/CN2008/072795
§ 371 (c)(1),
(2), (4) Date: Apr. 23, 2010

(87) PCT Pub. No.: WO2009/056049
PCT Pub. Date: May 7, 2009

(65) Prior Publication Data
US 2010/0306839 A1    Dec. 2, 2010

(30) Foreign Application Priority Data
Oct. 23, 2007  (CN) .......................... 2007 1 0018920

(51) Int. Cl.
G06F 7/04 (2006.01)
G06F 15/16 (2006.01)
G06F 17/30 (2006.01)
H04L 29/06 (2006.01)
H04L 9/32 (2006.01)

(52) U.S. Cl. ............................. 713/170; 713/155; 726/9

(58) Field of Classification Search .......... 713/155–159, 713/161, 168–170, 172–173, 176; 726/2–3, 726/9–10
See application file for complete search history.

(56) References Cited

U.S. PATENT DOCUMENTS
5,491,750 A * 2/1996 Bellare et al. ................. 713/155
(Continued)

FOREIGN PATENT DOCUMENTS
CN         1345498         4/2002
(Continued)

OTHER PUBLICATIONS
Russian Decision on Grant Patent for Invention regarding Application No. 2010120133, dated Feb. 21, 2012. Translation provided by Unitalen Attorneys At Law.
(Continued)

Primary Examiner — Philip Chea
Assistant Examiner — Trong Nguyen
(74) Attorney, Agent, or Firm — Harness, Dickey & Pierce, P.L.C.

(57) ABSTRACT

An entity bi-directional identification method and system based on a trustable third party thereof are provided. The system comprises a first entity, which is for sending a first message to a second entity, sending a third message to a third entity after receiving a second message sent by the second entity, verifying the fourth message after receiving a fourth message sent by the third entity, sending a fifth message to the second entity after the verification is finished; the second entity, which is for receiving the first message sent by the first entity, sending the second message to the first entity, verifying the fifth message after receiving the fifth message sent by the first entity; the third entity, which is for receiving the third message sent by the first entity, checking if the first entity and the second entity are legal, implementing the pretreatment according to the checking result, sending the first entity the fourth message after the treatment is finished.

8 Claims, 1 Drawing Sheet

U.S. PATENT DOCUMENTS

| | | | |
|---|---|---|---|
| 7,734,922 B2* | 6/2010 | Lee et al. | 713/171 |
| 2002/0164026 A1 | 11/2002 | Huima | |
| 2004/0059685 A1* | 3/2004 | Sakamura et al. | 705/65 |
| 2005/0251691 A1 | 11/2005 | Haufe | |
| 2005/0268096 A1 | 12/2005 | Kilian-Kehr et al. | |
| 2006/0095766 A1* | 5/2006 | Zhu et al. | 713/168 |
| 2006/0135141 A1 | 6/2006 | Wilson et al. | |
| 2006/0281442 A1* | 12/2006 | Lee et al. | 455/412.2 |
| 2007/0055881 A1 | 3/2007 | Fuchs et al. | |
| 2007/0150943 A1* | 6/2007 | Guo et al. | 726/5 |

FOREIGN PATENT DOCUMENTS

| | | |
|---|---|---|
| CN | 1694395 | 11/2005 |
| CN | 1697373 A | 11/2005 |
| CN | 101009556 A | 8/2007 |
| CN | 101145910 | 3/2008 |
| CN | 101640593 A | 2/2010 |
| EP | 1601154 A1 | 11/2005 |
| JP | 8297638 A | 11/1996 |
| JP | 8335208 A | 12/1996 |
| RU | 2278477 C2 | 6/2006 |
| RU | 2295200 C2 | 3/2007 |
| WO | WO-2006079953 A1 | 8/2006 |
| WO | WO-2006129934 A1 | 12/2006 |
| WO | WO-2007000179 A1 | 1/2007 |
| WO | WO-2007030213 A2 | 3/2007 |
| WO | WO-2007107708 A2 | 9/2007 |

OTHER PUBLICATIONS

IEEE Standards 802.11i. IEEE Standard for Information technology—Telecommunications and information exchange between systems—Local and metropolitan area networks—Specific requirements. Part 11: Wireless LAN Medium Access Control (MAC) and Physical Layer (PHY) specifications. Amendment 6: Medium Access Control (MAC) Security Enhancements. IEEE Computer Society. Jun. 24, 2004.

First Russian Office Action regarding Application No. 2010120133/08(028617), dated Aug. 17, 2011. Translation provided by Unitalen Attorneys At Law.

Dorot Vyacheslav et al. "Explanatory Dictionary on Modern Computer Vocabulary." 3rd edition. 2004. Translation provided by Unitalen Attorneys At Law.

Akihiro Yamamura. "Safety Assessment of the ISO/IEC 9798 protocol." Graduate School of Engineering, Akita University Graduate School Resources. Feb. 4, 2011. Abstract provided by Unitalen Attorneys At Law.

R.M. Needham & M.D. Schroeder. "Authentication Revisited." Jan. 1987.

Roger M. Needham and Michael D. Schroeder. "Using Encryption for Authentication in Large Networks of Computers." Communications of the ACM. vol. 21, No. 12. Dec. 1978.

"Survey on Status of Identity Authentication Technologies." Security Center of Information-technology Promotion Agency, Japan. Mar. 2003. Translation provided by Unitalen Attorneys At Law.

* cited by examiner

ENTITY BI-DIRECTIONAL IDENTIFICATOR METHOD AND SYSTEM BASED ON TRUSTABLE THIRD PARTY

CROSS-REFERENCE TO RELATED APPLICATIONS

This application is a 371 U.S. national stage of International Application No. PCT/CN2008/072795, filed Oct. 23, 2008.

This application claims priority to Chinese Patent Application no. 200710018920.6, filed with the Chinese Patent Office on Oct. 23, 2007 and entitled "METHOD AND SYSTEM FOR MUTUAL AUTHENTICATION OF ENTITIES BASED UPON TRUSTED THIRD PARTY", which is hereby incorporated by reference in its entirety.

FIELD OF THE INVENTION

The present invention relates to the communications field and in particular to a method for mutual authentication of entities based upon a trusted third party and a system thereof.

BACKGROUND OF THE INVENTION

At present, mutual authentication is typically implemented between a user and a network access point over a communication network to guarantee the access of a valid user to a valid network. Entity authentication methods using an asymmetric cryptographic technique may be categorized into two kinds: unilateral authentication and mutual authentication. Particularly, uniqueness/timeliness of authentication is controlled by generating and checking time variant parameters such as time stamps, sequence numbers, or random numbers. If time stamps or sequence numbers are used as time variant parameters, the mutual authentication between entities can be completed by two pass authentication; or if random numbers are used as time variant parameters, the mutual authentication between entities can be completed by three pass authentication or two parallel authentication.

Before or during operation of the authentication mechanism, a verifier shall be provided with a valid public key of a claimant, otherwise the authentication might be endangered or fail. A three pass mutual authentication is described here as an example.

Referring to FIG. 1, the authentication system includes two authentication entities A and B. The authentication entity A transmits a token TokenAB=$R_A\|R_B\|B|Text3\|sS_A(R_A\|R_B\|B\|Text2)$ to the authentication entity B, and the authentication entity B transmits a token TokenBA=$R_B\|R_A\|A\|Text5\|sS_B(R_B\|R_A\|A\|Text4)$ to the authentication entity A, where $sS_X$ denotes a signature of an entity X, Rx denotes a random number generated by the entity X, $Cert_X$ denotes a certificate of the entity X, and Text2, Text3, Text4 and Text 5 denote optional text fields, and X denotes an authentication entity distinguishing identifier, here A or B.

A process of operating the three pass authentication mechanism is described in detail below:

1) The entity B transmits a random number $R_B$ and an optional text field Text1 to the entity A;

2) The entity A transmits a token TokenAB and an optional certificate field $Cert_A$ to the entity B;

3) The entity B performs the following steps upon reception of the message transmitted from the entity A:

3.1) Guaranteeing to obtain a valid public key of the entity A either by verifying the certificate of the entity A or by some other means; and 3.2) Verifying the signature of the entity A contained in the token TokenAB in the step 2), checking the correctness of the entity distinguishing identifier B, and checking that the random number $R_B$ transmitted in step 1) is consistent with the random number $R_B$ contained in the token TokenAB, so that the entity A is authenticated by the entity B;

4) The entity B transmits the token TokenAB and an optional certificate field $Cert_B$ to the entity A; and 5) The entity A performs the following steps upon reception of the message including the token TokenBA transmitted from the entity B:

5.1) Guaranteeing to obtain a valid public key for the entity B either by verifying the certificate of the entity B or by some other means; and 5.2) Verifying the signature of the entity B contained in the token TokenBA in the step 4), checking the correctness of the entity distinguishing identifier A, and checking that the random number $R_A$ transmitted in the step 2) is consistent with the random number $R_A$ contained in the token TokenBA and that the random number $R_B$ received in the step 1) is consistent with the random number $R_B$ contained in the token TokenBA, so that the entity B is authenticated by the entity A.

As can be apparent, successful operation of the three pass authentication mechanism is guaranteed under the condition that the entity A and the entity B possess respectively the valid public keys of each other, but the protocol does not involve how to obtain the valid public keys and the validity thereof. However, this guaranteeing condition can not be satisfied in many application scenarios at present. For example, a user access control function is typically realized by the entity authentication mechanism over a communication network, and thus an access of a user to the network is prohibited before a successful operation of the authentication mechanism, and consequently it is impossible or difficult for the user to access a certificate authority and even impossible to obtain the validity of the public key of an opposite entity, i.e., a network access point, prior to the authentication.

SUMMARY OF THE INVENTION

In order to address the technical problem in the prior art, the invention proposes a method and system for mutual authentication of entities based upon a trusted third party so that un-authenticated entities can be authenticated successfully without required knowledge of a valid public key of an opposite communication entity prior to authentication.

An embodiment of the invention provides a method for mutual authentication of entities based upon a trusted third party, which includes:

step 1). transmitting a first message from a first entity to a second entity, the first message including a first time variant parameter $R1_A$ generated by the first entity, the identifier $ID_A$ of the first entity and a first optional text field Text1;

step 2). transmitting a second message from the second entity to the first entity on reception of the first message, the second message including a token TokenBA transmitted from the second entity to the first entity, the identifier $ID_B$ of the second entity and a second optional text field Text2;

step 3). transmitting a third message from the first entity to a third entity upon reception of the second message, the third message including a second time variant parameter $R2_A$ generated by the first entity, a time variant parameter $R_B$ generated by the second entity, the identifier $ID_A$ of the first entity, the identifier $ID_B$ of the second entity and a third optional text field Text3;

step 4). verifying by a third entity upon reception of the third message whether the first entity and the second entity are legal, and performing a presetting process in response to a verification result;

step 5). transmitting a fourth message from the third entity to the first entity, the fourth message including a token TokenTA transmitted from the third entity to the first entity and a fourth option text field Text4;

step 6). verifying the fourth message by the first entity upon reception of the fourth message, to complete the authentication of the second entity after the first entity verifies the fourth message;

step 7). transmitting a fifth message from the first entity to the second entity, the fifth message including the token TokenTA transmitted from the third entity to the first entity, a token TokenAB transmitted from the first entity to the second entity and a fifth optional text field Text5 or including a second sub-token TokenTA2 transmitted from the third entity to the first entity, a token TokenAB transmitted from the first entity to the second entity and a fifth optional text field Text5; and step 8). verifying the fifth message by the second entity upon reception of the fifth message, to complete the authentication of the first entity after the second entity verifies the fifth message.

Preferably, the step 4) of verifying whether the first entity and the second entity are legal and performing the presetting process in response to the verification result includes: if the $ID_A$ and the $ID_B$ in the third message are certificates, verifying the certificate of the first entity and the certificate of the second entity for validity, and if the certificate of the first entity and/or the certificate of the second entity is invalid, discarding the third message and ending the authentication flow, or, returning the fourth message to the first entity and going to the step 5); or if the certificate of the first entity and the certificate of the second entity are valid, returning the fourth message to the first entity and going to the step 5).

Preferably, the step 4) of verifying whether the first entity and the second entity are legal and performing the presetting process in response to the verification result includes: if the $ID_A$ and the $ID_B$ in the third message are distinguishing identifiers, verifying a public key of the first entity and a public key of the second entity for validity, and if the public key of the first entity and/or the public key of the second entity is invalid, discarding the third message and ending the authentication flow, or, returning the fourth message to the first entity; or if the public key of the first entity and the public key of the second entity are valid, returning the fourth message to the first entity.

Preferably, the step 6) of verifying the fourth message by the first entity includes: 601. verifying a signature of the third entity contained in the TokenTA or a first sub-token TokenTA1 transmitted from the third entity to the first entity and whether $R2_A$ in the third message is consistent with $R2_A$ in the TokenTA or TokenTA1, and if the verification is passed, obtaining a result of verifying the second entity, determining whether the second entity is legal, and if the second entity is legal, going to the step 602; if the second entity is illegal, ending the authentication flow or going to the step 7); and 602. obtaining a public key of the second entity, verifying a signature of the second entity contained in the TokenBA in the second message and whether the $R1_A$ in the first message is consistent with $R1_A$ in the TokenAB, and if the verification is passed, going to the step 7), so that the second entity is authenticated by the first entity.

Preferably, the step 8) of verifying the fifth message by the second entity includes: 801. verifying a signature of the third entity contained in the TokenTA or the TokenTA2 and whether $R_B$ in the second message is consistent with $R_B$ in the TokenTA or the TokenTA2, and if the verification is passed, obtaining a result of verifying the first entity, determining whether the first entity is valid, and if the first entity is valid, going to the step 802; if the first entity is invalid, ending the authentication flow; and 802. obtaining a public key of the first entity, verifying a signature of the first entity contained in the TokenAB and the $R_B$ in the second message is consistent with the $R_B$ in TokenAB, and if the verification is passed, the second entity completes the authentication of the first entity.

Preferably, the step 8) of verifying the fifth message by the second entity includes: 801. verifying a signature contained in the TokenTA or the TokenTA2 and whether $R_B$ in the second message is consistent with $R_B$ in the TokenTA or the TokenTA2, and if the verification is passed, obtaining a result of verifying the first entity, determining whether the first entity is valid, and if the first entity is valid, going to the step 802; if the first entity is invalid, ending the authentication flow; and 802. obtaining a public key of the first entity, verifying a signature contained in the TokenAB and the $R_B$ in the second message is consistent with the $R_B$ in TokenAB, and if the verification is passed, the second entity completes the authentication of the first entity.

Preferably, the $R2_A$ in the third message may be the same as the $R1_A$ in the first message.

Preferably, the time variant parameters may be random numbers, time tags or serial numbers.

Preferably, the step 1) is optional if the time variant parameters are random numbers or time tags.

Another embodiment of the present invention provides a system for mutual authentication of entities based upon a trusted third party, including: a first entity, adapted to transmit a first message to a second entity, to transmit a third message to a third entity upon reception of a second message transmitted from the second entity, to verify a fourth message upon reception of the fourth message transmitted from the third entity, and to transmit a fifth message to the second entity after the verification; the second entity, adapted to receive the first message transmitted from the first entity, to transmit the second message to the first entity, and to verify the fifth message upon reception of the fifth message transmitted from the first entity; and the third entity, adapted to receive the third message transmitted from the first entity, to verify whether the first entity and the second entity are legal, to perform a presetting process in response to a verification result, and to transmit the fourth message to the first entity after the process.

An embodiment of the invention provides a system for mutual authentication of entities based upon a trusted third party, which includes: a first entity adapted to transmit a first message to a second entity, to transmit a third message to a third entity upon reception of a second message transmitted from the second entity, to verify a fourth message upon reception of the fourth message transmitted from the third entity, and to transmit a fifth message to the second entity after the authentication; the second entity adapted to receive the first message transmitted from the first entity, to transmit the second message to the first entity, and to verify the fifth message upon reception of the fifth message transmitted from the first entity; and the third entity adapted to receive the third message transmitted from the first entity, to check the first entity and the second entity for legality, to perform a presetting process in response to a check result, and to transmit the fourth message to the first entity after the process.

As can be apparent from the forgoing embodiments of the invention, a triple entity architecture can be adopted so that authentication entities will retrieve a public key or a certificate of a third entity prior to authentication and retrieve a user certificate issued thereto for use from the third entity or submit its own public key to the third entity for safekeeping without required beforehand knowledge of a valid public key of an opposite authentication entity. During operation of a protocol, the public key of one of the authentication entities and validity thereof can be passed automatically to the opposite authentication entity through retrieval and verification by the third party entity. As compared with the traditional authentication mechanisms, the embodiments of the invention define an on-line retrieval and authentication mechanism of public keys to thereby enable centralized management of the public keys, simplify a condition of operating the protocol and achieve good feasibility and ease-to-use in a practical application.

DETAILED DESCRIPTION OF THE INVENTION

Figure 1:
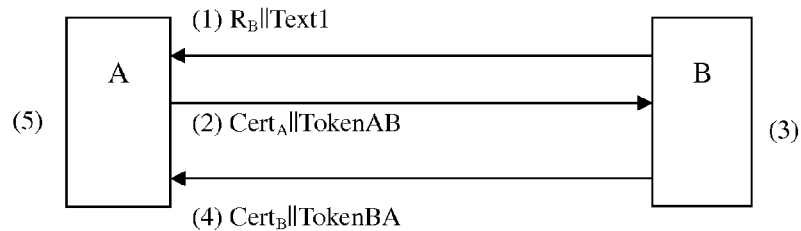
FIG. 1 is a schematic diagram of a three pass authentication mechanism in the prior art.
Figure 2:
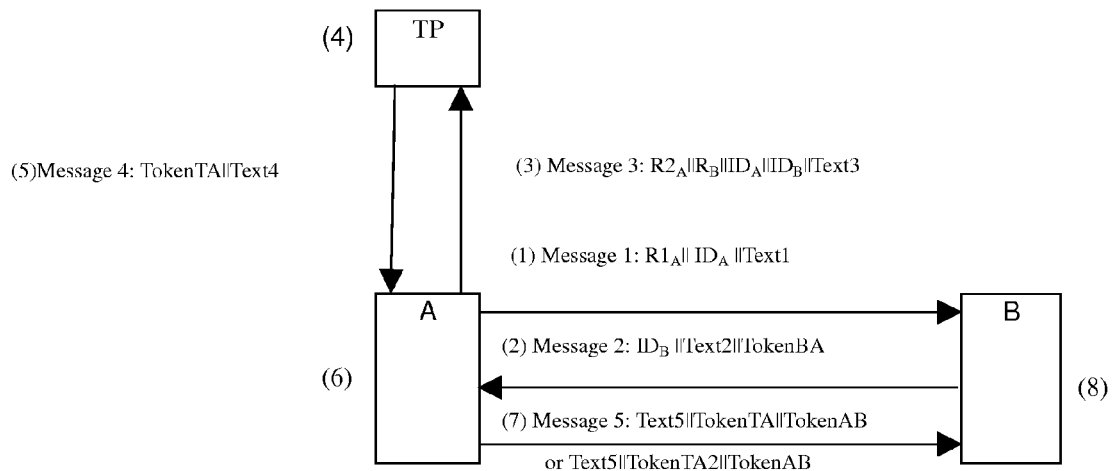
FIG. 2 is a schematic diagram of a mutual authentication method according to the invention.

Reference is made to FIG. 2 illustrating a schematic diagram of a mutual authentication method according to the invention. An embodiment of the invention involves three entities, i.e., two authentication entities A and B and a Trusted third Party (TP) entity which is a trusted third party of the authentication entities A and B, where $Valid_X$ denotes the validity of a certificate $Cert_X$, $PublicKey_X$ is a public key of an entity X, $ID_X$ is an identifier of the entity X, which is represented with $Cert_X$ or X, $Pub_X$ denotes a result of verifying the entity X and is composed of the certificate $Cert_X$ and validity $Valid_X$ thereof or composed of the entity X and the public key $PublicKey_X$ thereof, and X is an authentication entity distinguishing identifier, in the present embodiment, A or B.

In the present embodiment, respective tokens are defined as follows:

TokenBA=$R1_A\|R_B\|ID_A\|sS_B(R1_A\|R_B\|ID_A\|Text2)$: a token transmitted to the authentication entity A from the authentication entity B, where $R1_A$ is a first random number generated by the authentication entity A;

TokenAB=$sS_A(R_B\|R1_A\|ID_B\|Text5\|TokenTA)$: a token transmitted to the authentication entity B from the authentication A;

TokenTA=$R2_A\|R_B\|Pub_A\|Pub_B\|sS_{TP}$
$(R2_A\|R_B\|Pub_A\|Pub_B\|Text4)$: a token transmitted to the authentication entity A from the trusted third party, where $R2_A$ is a second random number generated by the authenticator entity A.

Alternatively, they can be defined as follows:
TokenTA=TokenTA1∥TokenTA2
TokenTA1=$R2_A\|Pub_B\|Text6\|sS_{TP}(R2_A\|Pub_B\|Text6)$
TokenTA2=$R_B\|Pub_A\|Text7\|sS_{TP}(R_B\|Pub_A\|Text7)$ A specific flow of the method is as follows:

1) The authentication entity A transmits to the authentication entity B a message 1 including the first random number $R1_A$ generated by the authentication entity A, the identifier $ID_A$ of the authentication entity A and an optional text field Text1.

2) On receiving the message 1, the authentication entity B transmits to the authentication entity A a message 2 including the token TokenBA transmitted from the authentication entity B to the authentication entity A, the identifier $ID_B$ of the authentication entity B and an optional text field Text 2.

3) On receiving the message 2, the authentication entity A transmits to the trusted third party entity a message 3 including the second random number $R2_A$ generated by the authentication entity A, a random number $R_B$ generated by the authentication entity B, the identifier $ID_A$ of the authentication entity A, the identifier $ID_B$ of the authentication entity B and an optional text field Text 3.

4) The trusted third party entity verifies the authentication entity A and the authentication entity for legality on receiving the message 3.

Particularly, if the identifiers of the authentication entity A and the authentication entity B in the message 3 are certificates, the certificate of the authentication entity A and the certificate of the authentication entity B are verified for validity; and if the certificate of the authentication entity A and/or the certificate of the authentication entity B is invalid, the message 3 is discarded directly and the authentication flow ends, or, a message 4 is returned to the authentication entity A and the flow goes to the step 5); and if the certificate of the authentication entity A and the certificate of the authentication entity B are valid, the message 4 is returned to the authentication entity A and the flow goes to the step 5).

If the identifiers of the authentication entity A and the authentication entity B in the message 3 are distinguishing identifiers, the public key of the authentication entity A and the public key of the authentication entity B are verified for validity, and if the public key of the authentication entity A and/or the public key of the authentication entity B is invalid, the message 3 is discarded directly and the authentication flow ends, or, the message 4 is returned to the authentication entity A and the flow goes to the step 5); and if the public key of the authentication entity A and the public key of the authentication entity B are valid, the message 4 is returned to the authentication entity A and the flow goes to the step 5).

5) The trusted third party entity transmits to the authentication entity A the message 4 including the token TokenTA transmitted from the trusted third party entity to the authentication entity A and an optional text field Text4.

6) The authentication entity A verifies the message 4 on receiving the message 4.

Particularly, this verification process includes:
6.1) Verifying a signature of the trusted third party entity contained in the token TokenTA or the token TokenTA1 and whether the second random number $R2_A$ generated by the authentication entity A in the message 3 is consistent with $R2_A$ in the token TokenTA or the token TokenTA1; if the verification is passed, going to the step 6.2);

6.2) Obtaining a result $Pub_B$ of verifying the authentication entity B, determining whether the authentication entity B is legal, and if the authentication entity B is legal, going to the step 6.3); otherwise, ending the authentication flow or going to the step 7); and 6.3) Obtaining the public key of the authentication entity B, verifying a signature of the authentication entity B contained in the token TokenBA in the message 2 and whether the random number $R1_A$ generated by the authentication entity A in the message 1 is consistent with $R1_A$ in the token TokenBA; if the verification is passed, going to the step 7), where first entity completes the authentication of the second entity.

7) The authentication entity A transmits to the authentication entity B a message 5 including the token TokenTA, the token TokenAB and an optional text field Text5 or including the token TokenTA2, the token TokenAB and an optional text field Text5.

8) The authentication entity B verifies the message 5 on receiving the message 5.

Particularly, this verification process includes:

8.1) Verifying a signature of the trusted third party contained in the token TokenTA or the token TokenTA2 and whether the $R_B$ generated by the authentication entity B in the message 2 is consistent with the $R_B$ in the token TokenTA or the token TokenTA2; if the verification is passed, going to the step 8.2);

8.2) Obtaining a result $Pub_A$ of verifying the authentication entity A, determining whether the authentication entity A is legal, and if the authentication entity A is legal, going to the step 8.3); if the authentication entity A is illegal, ending the authentication flow; and 8.3) Obtaining the public key of the authentication entity A, verifying a signature of the authentication entity A contained in the token TokenAB and whether the $R_B$ in the message 2 is consistent with $R_B$ in the token TokenAB, and if the verification is passed, the second entity has completed the authentication of the first entity.

It shall be noted that the time variant parameters are random numbers in the foregoing embodiment. Alternatively, time stamps or sequence numbers may be used as the time variant parameters, and in this case, the message 1 is an optional message, that is, the step 1) can be omitted.

In correspondence with a method for mutual authentication of entities based upon a trusted third party in the foregoing embodiment of the invention, an embodiment of the invention further provides a system for mutual authentication of entities based upon a trusted third party, which includes an entity A, an entity B and a trusted third party entity, where either or both of the mutually connected entity A and entity B can be connected with the trusted third party entity. The trusted third party entity may be an authentication service entity already existing in or newly added to the system. For example, the trusted third party entity may be an authentication server already existing in or newly added to the system in an application to a user and a network access point.

The invention claimed is:

1. A method for mutual authentication of entities based upon a trusted third party, comprising:
   step 1). transmitting a first message from a first entity to a second entity, the first message comprising a first time variant parameter $R1_A$ generated by the first entity, an identifier $ID_A$ of the first entity and a first optional text field Text1;
   step 2). transmitting a second message from the second entity to the first entity on reception of the first message, the second message comprising a token TokenBA transmitted from the second entity to the first entity, an identifier $ID_B$ of the second entity and a second optional text field Text2;
   step 3). transmitting a third message from the first entity to a third entity upon reception of the second message, the third message comprising a second time variant parameter $R2_A$ generated by the first entity, a time variant parameter $R_B$ generated by the second entity, the identifier $ID_A$ of the first entity, the identifier $ID_B$ of the second entity and a third optional text field Text3;
   step 4). verifying by the third entity upon reception of the third message whether the first entity and the second entity are legal, and performing a presetting process in response to a verification result;
   step 5). transmitting a fourth message from the third entity to the first entity, the fourth message comprising a token TokenTA transmitted from the third entity to the first entity and a fourth optional text field Text4;
   step 6). verifying the fourth message by the first entity upon reception of the fourth message, to complete the authentication of the second entity after the first entity verifies the fourth message;
   step 7). transmitting a fifth message from the first entity to the second entity, the fifth message comprising the token TokenTA transmitted from the third entity to the first entity, a token TokenAB transmitted from the first entity to the second entity and a fifth optional text field Text5 or including a second sub-token TokenTA2 transmitted from the third entity to the first entity, a token TokenAB transmitted from the first entity to the second entity and a fifth optional text field Text5; and
   step 8). verifying the fifth message by the second entity upon reception of the fifth message, to complete the authentication of the first entity after the second entity verifies the fifth message;
   wherein the step 6) of verifying the fourth message by the first entity comprises:
   601. verifying a signature of the third entity contained in the TokenTA or a first sub-token TokenTA1 transmitted from the third entity to the first entity and whether $R2_A$ in the third message is consistent with $R2_A$ in the TokenTA or TokenTA1, and if the verification is passed, obtaining a result of verifying the second entity, determining whether the second entity is legal, and if the second entity is legal, going to step 602; if the second entity is illegal, ending the authentication or going to the step 7); and
   602. obtaining a public key of the second entity, verifying a signature of the second entity contained in the TokenBA in the second message and whether the $R1_A$ in the first message is consistent with $R1_A$ in the TokenAB, and if the verification is passed, going to the step 7), so that the second entity is authenticated by the first entity.

2. The method according to claim 1, wherein the step 4) of verifying whether the first entity and the second entity are legal and performing the presetting process in response to the verification result comprises:
   if the $ID_A$ and the $ID_B$ in the third message are certificates, verifying the certificate of the first entity and the certificate of the second entity for validity, and if the certificate of the first entity and/or the certificate of the second entity is invalid, discarding the third message and ending the authentication, or, returning the fourth message to the first entity and going to the step 5); or if the certificate of the first entity and the certificate of the second entity are valid, returning the fourth message to the first entity and going to the step 5).

3. The method according to claim 1, wherein the step 4) of verifying whether the first entity and the second entity are legal and performing the presetting process in response to the verification result comprises:
   if the $ID_A$ and the $ID_B$ in the third message are distinguishing identifiers, verifying a public key of the first entity and a public key of the second entity for validity, and if the public key of the first entity and/or the public key of the second entity is invalid, discarding the third message and ending the authentication, or, returning the fourth message to the first entity and going to the step 5); or if the public key of the first entity and the public key of the second entity are valid, returning the fourth message to the first entity and going to the step 5).

4. The method according to claim 1, wherein the step 8) of verifying the fifth message by the second entity comprises:

801. verifying a signature of the third entity contained in the TokenTA or the TokenTA2 and whether $R_B$ in the second message is consistent with $R_B$ in the TokenTA or the TokenTA2, and if the verification is passed, obtaining a result of verifying the first entity, determining whether the first entity is valid, and if the first entity is valid, going to step 802; if the first entity is invalid, ending the authentication; and 802. obtaining a public key of the first entity, verifying a signature of the first entity contained in the TokenAB and the $R_B$ in the second message is consistent with $R_B$ in the TokenAB, and if the verification is passed, the second entity completes the authentication of the first entity.

5. The method according to claim 4, wherein the $R2_A$ in the third message is the same as the $R1_A$ in the first message.

6. The method according to claim 5, wherein the first time variant parameter $R1_A$, the second time variant parameter $R2_A$ and the time variant parameter $R_B$ are random numbers, time tags or serial numbers.

7. The method according to claim 6, wherein the step 1) is optional if the first time variant parameter $R1_A$, the second time variant parameter $R2_A$ and the time variant parameter $R_B$ are random numbers or time tags.

8. A system for mutual authentication of entities based upon a trusted third party, comprising: a first entity, a second entity and an authentication server, wherein the first entity and the second entity are connected with the authentication server, the first entity, adapted to transmit a first message to the second entity, to transmit a third message to the authentication server upon reception of a second message transmitted from the second entity, to verify a fourth message upon reception of the fourth message transmitted from the authentication server, and to transmit a fifth message to the second entity after the verification, wherein the first message comprises a first time variant parameter $R1_A$ generated by the first entity, an identifier $ID_A$ of the first entity and a first optional text field Text1, the third message comprises a second time variant parameter $R2_A$ generated by the first entity, a time variant parameter $R_B$ generated by the second entity, the identifier $ID_A$ of the first entity, an identifier $ID_B$ of the second entity and a third optional text field Text3, the fifth message comprises a token TokenTA transmitted from the authentication server to the first entity, a token TokenAB transmitted from the first entity to the second entity and a fifth optional text field Text5 or including a second sub-token TokenTA2 transmitted from the authentication server to the first entity, the token TokenAB transmitted from the first entity to the second entity and a fifth optional text field Text5, wherein the first entity, adapted to verify the fourth message comprises: the first entity, adapted to verify a signature of the authentication server contained in the TokenTA or a first sub-token TokenTA1 transmitted from the authentication server to the first entity and whether $R2_A$ in the third message is consistent with $R2_A$ in the TokenTA or TokenTA1, and if the verification is passed, to obtain a result of verifying the second entity, to determine whether the second entity is legal, and if the second entity is legal, to obtain a public key of the second entity, to verify a signature of the second entity contained in a token TokenBA in the second message and whether the $R1_A$ in the first message is consistent with $R1_A$ in the TokenAB;

the second entity, adapted to receive the first message transmitted from the first entity, to transmit the second message to the first entity, and to verify the fifth message upon reception of the fifth message transmitted from the first entity, wherein the second message comprises the token TokenBA transmitted from the second entity to the first entity, the identifier $ID_B$ of the second entity and a second optional text field Text2; and the authentication server, adapted to receive the third message transmitted from the first entity, to verify whether the first entity and the second entity are legal, to perform a presetting process in response to a verification result, and to transmit the fourth message to the first entity after the process, wherein the fourth message comprises a token TokenTA transmitted from the authentication server to the first entity and a fourth optional text field Text4, wherein the first and second entities include a transmitter to transmit messages and a receiver to receive messages.

* * * * *